United States Patent [19]
Rosenberg

[11] 3,938,552
[45] Feb. 17, 1976

[54] REGULATED FLUID TAP PARTICULARLY USEFUL AS WATER TRICKLER NOZZLE

[76] Inventor: Peretz Rosenberg, Moshav Beit Shearim, Israel

[22] Filed: May 25, 1973

[21] Appl. No.: 364,049

[30] Foreign Application Priority Data
June 2, 1972  Israel............................... 39593
Aug. 25, 1972  Israel............................... 40202

[52] U.S. Cl. ............. 137/624.14; 239/542; 239/99; 239/101; 251/145
[51] Int. Cl.² ............................................. B05B 1/08
[58] Field of Search ............ 239/101, 102, 99, 542; 137/624.14, 525, 513.15, 512.5; 251/145

[56] References Cited
UNITED STATES PATENTS

| | | | |
|---|---|---|---|
| 1,780,876 | 11/1930 | Grosse | 239/102 UX |
| 2,646,039 | 7/1953 | Agosti | 239/102 UX |
| 2,890,838 | 6/1959 | Jennsen | 137/525 X |
| 3,039,699 | 6/1962 | Allen | 137/624.14 X |
| 3,275,030 | 9/1966 | Alvin | 251/145 X |
| 3,384,113 | 5/1968 | Pennisi | 137/525 |

*Primary Examiner*—Alan Cohan
*Attorney, Agent, or Firm*—Benjamin J. Barish

[57] ABSTRACT

A regulated fluid tap particularly useful as water trickler nozzle includes an inlet tube, a housing enclosing the tube outlet, and a regulating member disposed within the housing and set into vibratory movement, by the flow of the fluid, toward and away from the tube outlet to close and open the outlet. The flow of the fluid is thereby regulated to a slow trickle without the need for a circuitous path or small openings which can be easily clogged. Two embodiments are described: in one, the regulating member is of ring-shape and vibrates radially of the tube; in the other, the regulating member is of disc-shape and vibrates axially of the tube.

9 Claims, 7 Drawing Figures

3,938,552

REGULATED FLUID TAP PARTICULARLY USEFUL AS WATER TRICKLER NOZZLE

BACKGROUND OF THE INVENTION

The present invention relates to a regulated tap for fluid conduits such as water pipes, and particularly to a tap useful as a water trickler nozzle.

There are many applications for regulated taps for fluid conduits. One such application gaining widespread use is in trickle irrigation, wherein a trickler nozzle is tapped to a water supply pipe to provide a slow flow or trickle of irrigating water. The trickler nozzles presently used are generally characterised by the provision of a circuitous path or small openings for the water in order to have the water exit in a slow trickle. Such nozzles are costly to produce and easily become clogged.

SUMMARY OF THE INVENTION

In the above referenced Divisional Application, there are described fluid-flow control devices comprising a conduit member connectable to a source of pressurized fluid to be controlled and including an inlet opening, an axial passageway, and an outlet opening through which the fluid flows; and a regulating member movable towards and away from the conduit member outlet opening to close and open same and thereby to control the flow of fluid therethrough. An important feature of the devices therein described is that the face of the conduit member in which the outlet opening is formed is curved, and the face of the regulating member closing the outlet opening is also curved but with a different curvature from that of the conduit member face. The arrangement is such that the curved regulating member face diverges from the curved conduit member face outwardly from the periphery of the outlet opening formed in the latter face to provide a spacing between the two curved faces which increases from the periphery of the outlet opening outwardly thereof. Thus, as the regulating member moves away from the conduit member outlet opening, the velocity gradient produces a pressure gradient which is lower at the periphery of the outlet opening than outwardly thereof, and which therefore tends to move the regulating member towards the conduit member outlet to close same. This pressure gradient acts with the fluid force to set the regulating member into vibratory movement towards and away from the conduit member outlet opening during the flow of fluid therethrough.

The present invention provides fluid-flow control devices of the foregoing type which are particularly useful as water trickler nozzles.

According to the present invention, the regulating member is unattached and is freely supported so as to be freely movable with respect to the conduit member, the latter being a tube formed with the axial passageway. The device further includes a housing enclosing the regulating member and the outlet of the conduit member tube, the housing being formed with an outlet opening and the regulating member being freely movable between the tube and the housing.

In one described embodiment of the invention, the tube is formed with a radial passageway extending through its wall and communicating at its inner end with the axial passageway, the outer end of the radial passageway consituting the tube outlet opening. In this embodiment, the regulating member is in the form of a ring having an inner diameter slightly larger than the outer diameter of the tube and surrounding same at the radial opening, the vibratory movement of the ring being in a radial direction with respect to the tube to close and open the radial opening thereof.

In a second preferred embodiment described below, the tube axial passageway extends completely through the tube and forms an axial outlet therefrom, and the regulating member is disposed within the housing axially of the tube so as to be set into vibratory movement axially of the tube toward and away from the tube outlet.

BRIEF DESCRIPTION OF THE DRAWINGS

The two described embodiments of the invention are illustrated in the accompanying drawings, wherein.

DESCRIPTION OF THE PREFERRED EMBODIMENTS

Figure 1:
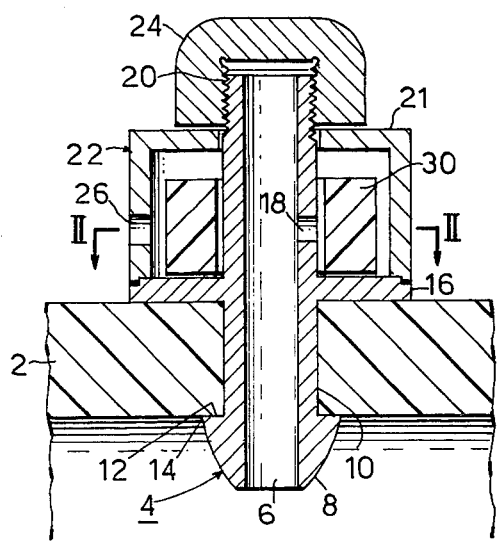
FIG. 1 is a longitudinal sectional view of one form of regulated water tap constructed in accordance with the invention.
Figure 2:
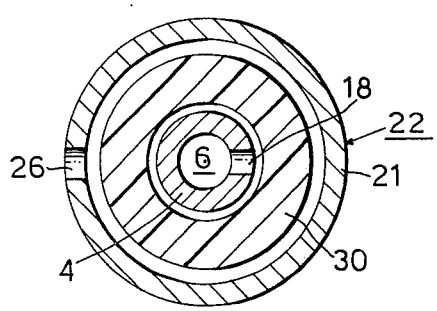
FIG. 2 is a transverse sectional view along lines II—II of FIG. 1.

The regulated water tap illustrated in FIGS. 1 and 2 is intended particularly for use as a water trickler nozzle tapped to a plastic water supply pipe 2. The tap includes a tube 4 having throughgoing axial bore 6. One end of the tube 4 is frustroconically tapered, as shown at 8, to facilitate its insertion into an opening formed in the wall of the water supply pipe 2. Above tapered portion 8, tube 4 is formed with an annular groove 10 for seating therein the wall of the plastic supply pipe 2. One end of groove 10 is defined by an annular wall 12 extending at right angles to the axis of the tube and joined to form a sharp edge 14 with the tapered portion 8 of the tube. The other end of groove 10 is defined by an annular disc 16 integrally formed with the tube.

Above disc 16, tube 4 is formed with a radial opening 18 communicating with axial bore 6. The upper end of the tube is threaded as shown at 20.

Annular disc 16 cooperates with a cap 21 to define a housing 22 surrounding the upper end of tube 4. Cap 21 is attached by means of a nut 24 threaded onto the upper tube end 20 and engageable with the cap to force it against the annular disc 16. Nut 24 also closes the upper end of the tube. An outlet opening 26 is formed in the wall of cap 21 opposite to radial opening 18 in tube 4.

Disposed within housing 22 is a regulating ring 30 having an inner diameter slightly larger than the outer diameter of tube 4, and an outer diameter slightly smaller than the inner diameter of housing 22. As shown, ring 30 is interposed between and aligned with radial opening 18 in tube 4 and opening 26 in housing 22. It is unattached and freely movable between the tube and housing, but is dimensioned so that it will limit to close opening 18 before it can limit to close outlet opening 26. It will be seen that since the regulating ring 30 is of a smaller inner diameter than the outer diameter of the tube 4, in both limit positions of the regulating ring 30 its inner surface forms a curved face which diverges from the outer curved face of the tube, to provide a spacing between the two curved faces which increases from the periphery of the outlet opening 18 outwardly thereof.

Ring 30 is dimensioned with respect to tube 4 and housing 22 such that when water flows through radial opening 18 of the tube, the ring will be set into a vibratory movement towards and away from the radial opening 18.

An explanation of what is believed to be the interplay of forces producing this vibratory movement is described in the above-referenced Divisional Application. Briefly, since the curvature of the outer face of tube 4 is greater (i.e. its radius of curvature is smaller) than the curvature of the inner face of ring 30 aligned with opening 18, the spacing between the two curved faces when the ring is against the tube is at a minimum at the periphery of opening 18 and increases from the periphery of the opening outwardly thereof. Thus, when the ring is against opening 18 it is pushed away from it by the fluid flowing through that opening, and as it moves in the opening direction, a pressure gradient is produced by the velocity gradient of the fluid flowing between the two faces of ring 30 and tube 4, the velocity being higher and the pressure therefore being lower at the periphery of opening 18 than outwardly thereof. The lower pressure around opening 18 tends to move ring back towards the tube to close the opening. This pressure gradient thus acts with the force of the pressurized fluid at opening 18 to set the ring into vibratory movement towards and away from the tube outlet opening 18 during the flow of the fluid through the tube, and thereby decreases the fluid flow to a trickle. For purposes of example, ring 30 may have an inner diameter of 4.5 mm and an outer diameter of 9.0 mm; tube 4 may have an outer diameter of 4 mm, a radial opening 18 of 1 mm diameter, and an axial passageway 6 of 2 mm diameter; and housing 22 may have an inner diameter of 10 mm. Such a tap was found to have an output of about 15 litres/hour, which output was fairly (but not necessarily exactly) uniform with a supply line pressure varying from 1 – 4 atmospheres.

If smaller or larger outputs are desired, the dimensions of the foregoing elements would be appropriately modified, but as a rule it is generally desirable that the inner diameter of ring be about 10 – 20% larger than the outer diameter of the tube, and the outer diameter of the ring be about 10–20% smaller than the inner diameter of the housing.

Outlet opening 26 in the housing may be very large and actually does not influence to any significant extent the quantity of water issuing from the tap. For example, the whole side of the housing 22 may be opened if desired. Radial opening 18 may vary in size, according to the flow rate desired, and this opening as well as outlet opening 26, may be non-circular, e.g., in the form of rectangular openings or slots.

Further, instead of closing the end of tube 4 by nut 24 (or by other means), that end may be left open and connected to supply water to one or more additional taps attached in series to the tap illustrated.

Since openings 18 and 26 in the regulating unit illustrated may be relatively large, even with very slow flow rates, they are less susceptible to clogging. Should the device become clogged, for example by a particle lodged in opening 18, the user can usually clear it by merely pushing a pointed instrument through outlet opening 26 to force ring 30 away from opening 18, whereupon a large quantity of water will flow through that opening into the housing and out through outlet 26, washing away the clogging matter. Therefore it is usually not necessary to dissemble the unit in order to clean it of clogging matter. Should it nevertheless be desired to disassemble it, this may conveniently be done by unthreading nut 24 to remove housing 22.

Figure 3:
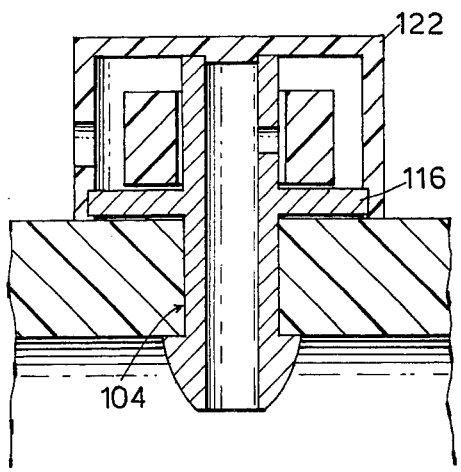
FIG. 3 is a longitudinal sectional view corresponding to FIG. 1 but illustrating a variation.

FIG. 3 illustrates a variation wherein the housing 122 is press-fitted onto annular disc 116 of the tube 104. The construction and operation of the device are otherwise the same as described with respect to FIGS. 1 and 2.

Figure 4:
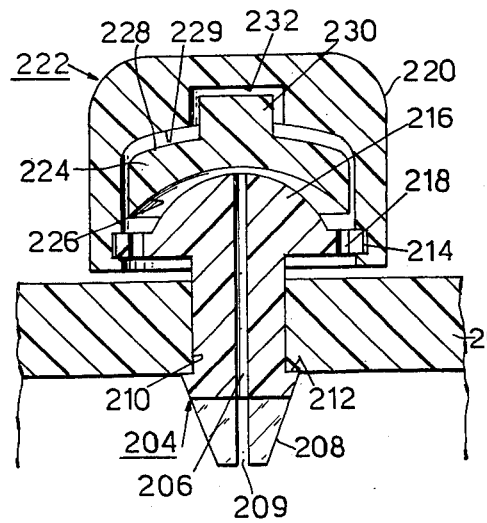
FIG. 4 is a longitudinal sectional view of a second form of water trickler nozzle constructed in accordance with the invention.
Figure 5:
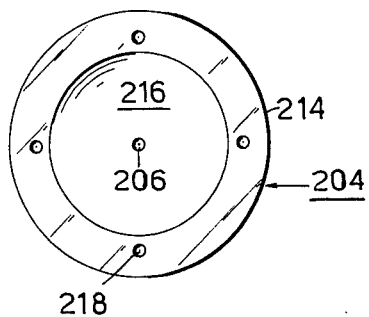
FIG. 5 is a top plan view of the water conducting tube in the trickler nozzle of FIG. 4.

FIGS. 4 and 5 illustrate a second form of water trickler nozzle tapped to a plastic water supply pipe 202. The nozzle includes a tube 204 having a throughgoing axial passageway 206. One end of tube 204 is frustoconically tapered, as shown at 208, and is formed with a pair of radial cross slits 209. The tapered end facilitates the insertion of the tube into an opening formed in the wall of the water supply pipe 202 and the cross slits 209 decrease the possibility of clogging that end of the tube when water passes from the supply pipe into axial passageway 206.

Above the tapered portion 208, tube 204 is formed with an annular groove 210 for seating the wall of the plastic supply pipe therein. One end of groove 210 is defined by an annular wall 212 extending at right angles to the axis of the tube, and the other end of groove 210 is defined by an annular ring 214 formed integrally with the tube. The outlet end 216 of the tube is of convex configuration and is circumscribed by ring 214. Ring 214 is formed with a plurality (four being shown, see FIG. 5) of the openings 218 for a purpose to be described below.

A dome shaped cap 220 is fixed to ring 214, as by having the ring press-fitted into an annular groove formed on the inner wall of the cap. Ring 214 and cap 220 define a housing 222 enclosing the outlet end 216 of the tube.

Disposed within housing 222 is a disc-shaped regulating member 224, there being sufficient space within the housing to permit free axial movement of this member toward and away from the tube outlet end 216. Face 226 of regulating member 224 adjacent tube outlet end 216 is of concave configuration and engages the convex tube outlet end 216, whereas the opposite face 228 of the regulating member is of convex configuration conforming to the concave inner surface 229 of cap 220. Regulating member 224 is further formed with an upstanding boss 230 receivable in a recess 232 formed centrally of the inner surface of cap 220.

The radius of curvature of concave face 226 of regulating member 224 is slightly larger than that of the convex tube outlet end 216. Thus, when the regulating member engages the tube outlet end 216, it will contact the same centrally of that end, i.e. at the outlet end of axial passageway 206, while the outer or peripheral portion of the concave face of the regulating member will be spaced from the corresponding portion of the convex tube outlet end. As one example, the radius of curvature of convex face 216 may be 5 mm and that of the concave face 226 may be 6 mm.

It has been found that when water issues from the end of the axial passageway 206 and impinges on the concave face 226 of regulating member 244, it sets the regulating member into vibration, moving same axially of the tube rapidly toward and away from the tube outlet end 226 to close and open the axial passageway 206. It is believed that this is brought about by the same interplay of forces as in the FIGS. 1–3 embodiment described above.

Thus on the one hand, the water flow through axial passageway 206, being at a higher velocity centrally of the regulating member where the water impinges thereon than at the outer edges where the increased space decreases the velocity, results in a low pressure area centrally of the regulating member at the inner face, and a higher pressure at the outer face, tending to move the member against the outlet of passageway 206. On the other hand, when the opening is thus closed, the tube water pressure acting on the inner side of the regulating member tends to move it away from the opening.

Whatever the explanation, this construction, as well as that of the FIGS. 1 - 3 embodiment, was found to produce the foregoing vibratory movement in the regulating member causing same to open and close the outlet opening in a very rapid manner.

Boss 230, moving within recess 232, guides the regulating member 224 during this vibratory movement. The water leaves the interior of the housing through outlet openings 218, the total area of which (four being shown) should be greater than the area of the outlet end of passageway 206.

Figure 7:
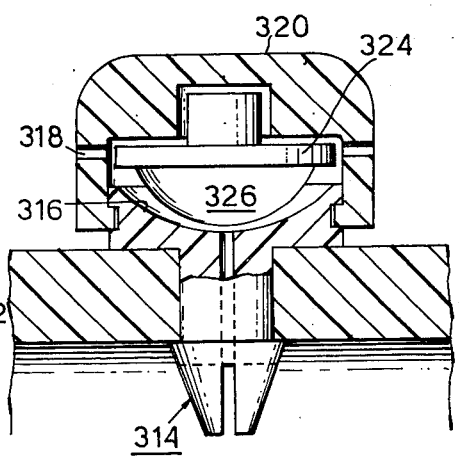
FIG. 7 is a longitudinal sectional view of a modification of the nozzle of FIGS. 4–6.
Figure 6:
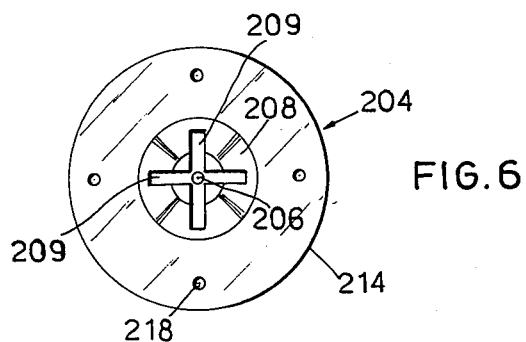
FIG. 6 is a bottom plan view of the water conducting tube of FIG. 4.

FIG. 7 illustrates a variation in this construction, wherein the outlet end of tube 314 (corresponding to tube 204 in FIGS. 4 – 6) is formed with a concave configuration 316, and the confronting face of the regulating member 324 is formed with a convex configuration 326. In this case, the radius of the curvature of the convex face 326 of the regulating member is smaller than that of the concave face 316 of the tube outlet end. In addition, the housing outlet openings 318 are formed in the cap 320 rather in the tube outlet end 316. The operation of the device of FIG. 7 is otherwise the same as described with respect to FIGS. 4 – 6.

I claim:

1. A fluid-flow control device comprising a conduit member connectable to a source of pressurized fluid to be controlled and including an inlet opening, an axial passageway, and an outlet opening through which the fluid flows, and a regulating member movable towards and away from the conduit member outlet opening to close and open same and thereby to control the flow of fluid therethrough; the regulating member being unattached and freely supported by the device so as to be freely movable within limit positions with respect to the conduit member; the face of the conduit member in which the outlet opening is formed being curved, and the face of the regulating member closing the outlet opening also being curved but with a different curvature from that of the conduit member face, such that in said limit positions of the regulating member, its curved face diverges from the curved conduit member face outwardly from the periphery of the outlet opening formed in the latter face to provide a spacing between the two curved faces which increases from the periphery of the outlet opening outwardly thereof, whereby as the regulating member moves away from the conduit member outlet opening to permit the fluid to flow therethrough, a pressure gradient is produced which is lower at the periphery of said opening than outwardly thereof, and which therefore tends to move the regulating member towards the conduit member outlet to close same, said pressure gradient acting with the fluid force to set the regulating member into rapid vibratory movement towards and away from the conduit member outlet opening during the flow of fluid therethrough.

2. A device according to claim 1, wherein the conduit member is a tube formed with the axial passageway, the device further including a housing enclosing the regulating member and the outlet of the conduit member, said housing being formed with an outlet opening, the regulating member being freely movable between the tube and the housing.

3. A tap according to claim 2, wherein the tube axial passageway extends completely through the tube and forms an axial outlet therefrom, and wherein the regulating member is disposed within the housing axially of the tube to set into vibratory movement axially of the tube toward and away from said tube outlet.

4. A tap according to claim 3, wherein said regulating member is substantially of disc shape, and wherein, during the vibratory movement of the regulating disc, one face thereof engages and limits against said tube outlet, and the opposite face thereof engages and limits against the inner surface of the housing.

5. A tap according to claim 4, wherein the face of the regulating disc opposite to that engageable with the tube outlet is formed with an upstanding boss receivable in a recess formed in the inner surface of the housing.

6. A tap according to claim 3, wherein said housing comprises an annular ring carried by the tube outlet, and a cap attached to said ring.

7. A device according to claim 2, wherein the tube is formed with a radial passageway through its wall communicating at its inner end with its axial passageway, the outer end of the radial passageway constituting said outlet opening; and wherein the regulating member is in the form of a ring having an inner diameter slightly larger than the outer diameter of the tube and surrounding same at the radial opening thereof, the housing outlet opening being on the side thereof opposite to the radial opening in the tube, said ring being disposed within the housing in alignment with the outlet opening of both the tube and the housing, the outer diameter of the ring being slightly smaller than the inner diameter of the housing, the vibratory movement of the ring being in a radial direction with respect to the tube to close and open said radial outlet opening thereof.

8. A tap according to claim 7, wherein said housing is defined by an annular disc fixed to said tube, and a cap attached to said disc by a nut threaded to the tube and engageable with the cap to force same against the disc.

9. A tap according to claim 7, wherein said ring has an inner diameter of about 10 – 20% larger than the outer diameter of the tube, and an outer diameter of about 10 – 20% smaller than the inner diameter of said housing.

* * * * *